United States Patent [19]

Seki et al.

[11] Patent Number: 4,959,675
[45] Date of Patent: Sep. 25, 1990

[54] DEVICE FOR ADJUSTING CAMERA IN THE INITIAL STAGE

[75] Inventors: Yoichi Seki; Kazuo Akimoto, both of Chiba, Japan

[73] Assignee: Seikosha Co., Ltd., Tokyo, Japan

[21] Appl. No.: 363,039

[22] Filed: Jun. 8, 1989

[30] Foreign Application Priority Data

Jun. 8, 1988 [JP] Japan .................................. 63-140795

[51] Int. Cl.⁵ .............................................. G03B 13/00
[52] U.S. Cl. .................................. 354/400; 354/195.1; 354/234.1
[58] Field of Search ................. 354/400, 195.1, 195.12, 354/412, 435, 401–409, 234.1, 235.1, 410, 456

[56] References Cited

U.S. PATENT DOCUMENTS 4,739,359  4/1988  Fukahori et al. ..................... 354/400
4,868,596  9/1989  Ishida et al. ......................... 354/400
4,881,096  11/1989  Ogihara et al. ..................... 354/400

Primary Examiner—Michael L. Gellner
Assistant Examiner—David M. Gray
Attorney, Agent, or Firm—Jordan and Hamburg

[57] ABSTRACT

A device for adjusting a camera in the initial stage comprises a motor for moving a lens or opening and closing sectors, a motor controller for controlling the rotation of the motor, a measuring device for measuring a focus or exposure and outputting a measured signal to the motor controller, and a measured signal compensator means for correcting the measured signal by outputting a signal to the motor controller. Thus, initial adjustment of a camera in the manufacturing process, for example, the focus adjustment in an infinite distance or the adjustment in an exposure operation, is effected by electronic control with a simplified mechanism and at a lowered cost.

20 Claims, 8 Drawing Sheets

| m | $3+(m-1)S$ | $4+(m-1)S$ | $5+(m-1)S$ | -------- | $3+n+(m-1)S$ |
|---|---|---|---|---|---|
| | | | | | |
| 3 | $3+2S$ | $4+2S$ | $5+2S$ | -------- | $3+n+2S$ |
| 2 | $3+S$ | $4+S$ | $5+S$ | -------- | $3+n+S$ |
| 1 | 3 | 4 | 5 | -------- | $3+n$ |
| AF STEP | CORRECTION 0 | CORRECTION 1 | CORRECTION 2 | -------- | CORRECTION n |

FIG. 7

DEVICE FOR ADJUSTING CAMERA IN THE INITIAL STAGE

BACKGROUND OF THE INVENTION

1. Field of the Invention

The present invention relates to a device for adjusting a camera in the initial stage which is designed so that the initial adjustment of focus, exposure, etc. can be effectively and readily conducted in the camera manufacturing process.

2. Description of the Related Art

Initial adjustment of cameras in the manufacturing process, for example, the focus adjustment in an infinite distance, has heretofore been effected mechanically in most cases. Examples of conventional mechanical adjustments include one in which a lens is moved spirally by means of a helicoid screw and another in which a lens is moved straight using a cam.

When the focus adjustment in an infinite distance is conducted by the former conventional method, that is, by spirally moving a lens with a helicoid screw, a slide board provided on a male helicoid screw is engaged with a lens drive member and, while the focus condition is being observed, the sliding board is slid and fixed with the screw at an optimal position before being bound.

In the latter method of adjustment wherein a lens is moved straight by the use of a cam, a lens frame is provided with a tap for standing a screw pin and the distal end of the screw pin is brought into contact with a rotating thrust cam to search for the best focus position and then the screw pin is bound or clamped at said position. Alternatively, the respective portions of a male helicoid screw and a lens frame which are engaged with each other are formed into slant surfaces to effect the focus adjustment in the same way.

The above-described conventional focus adjustments in an infinite distance suffer, however, from the following problems. Since the prior art methods are mechanically carried out, the mechanism is complicated and the cost is high. In addition, the operating process that includes adjustment, screwing and binding is complicated.

Particularly, in the case of the inner focusing method wherein focusing is effected by moving intermediate lenses among a plurality of lenses that constitute in combination a lens system, an exceedingly complicated mechanism is needed since the adjustment is conducted by moving the intermediate lenses, i.e., the second lens group, the third lens group, etc., with the front and rear lens groups left fixed after the lenses have been assembled together.

SUMMARY OF THE INVENTION

In view of the above-described circumstances, it is a primary object of the present invention to provide a device for adjusting a camera in the initial stage which has a simplified mechanism and a lowered cost, the device being designed so that adjustment of a camera in the initial stage is conducted by electronic control.

To this end, the present invention provides a device for adjusting a camera in the initial stage comprising: a motor for moving a lens or opening and closing sectors; motor control means for controlling the rotation of the motor; measuring means for measuring a focus or exposure and outputting a measured signal to the motor control means; and measured signal compensating means for correcting the measured signal by outputting a signal to the motor control means.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements and, of which:

FIGS. 1 to 7 show in combination one embodiment of the device for adjusting a camera in the initial stage according to the present invention, in which:

FIG. 1 is a front view showing the mechanism of the device in the initial state;

FIG. 2 is a block diagram showing the controller of the device;

FIG. 3 is a front view showing the mechanism in an operative state;

FIG. 4 is a sequence diagram showing the relationship between the lens drive and exposure control operation and the time in the normal shooting mode;

FIG. 5 is a sequence diagram showing the focus adjustment in an infinite distance;

FIG. 6 is a sequence diagram showing the normal shooting operation conducted after the focus adjustment in an infinite distance; and FIG. 7 shows the relationship between the distance signal, the correction quantity and the motor drive pulses.

DESCRIPTION OF THE PREFERRED EMBODIMENT

One embodiment of the present invention will be described below in detail with reference to the accompanying drawings. FIGS. 1 to 7 show in combination one embodiment of the device for adjusting a camera in the initial stage according to the present invention.

Figure 1:
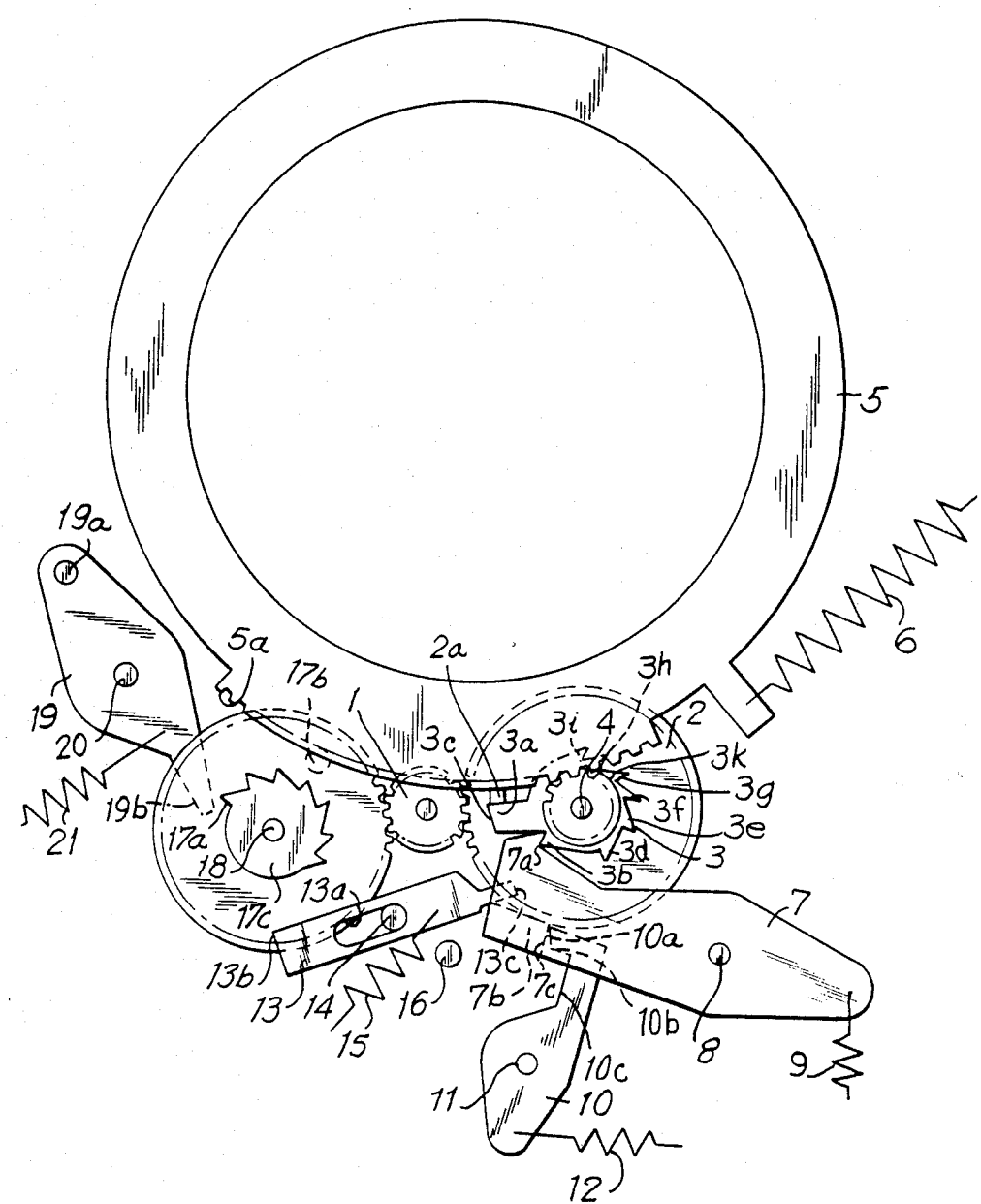

Referring first to FIG. 1, the reference numeral 1 denotes a gear which rotates together with the rotor of a stepping motor (described later) capable of forward and reverse rotation under control. The gear 1 meshes with a drive gear 2 and a control gear 17. A ratchet wheel 3 is provided on the same shaft 4 that carries the drive gear 2. The ratchet wheel 3 is capable of rotating independently of the drive gear 2. The ratchet wheel 3 is integrally formed with a toothed portion $3k$ which meshes with a toothed portion $5a$ of a lens drive ring 5. The ratchet wheel 3 has an arm $3a$ engaged with a projection $2a$ formed on the drive gear 2, thereby enabling the ratchet wheel 3 to rotate counterclockwise together with the drive gear 2.

The lens drive ring 5 is biased counterclockwise by the action of a spring 6 and coupled to a lens (not shown). The lens is driven to move from its initial position in response to the counterclockwise rotation of the lens drive ring 5.

The reference numeral 7 denotes a ratchet pawl member which is pivotally supported on a shaft 8. The rear end portion of the ratchet pawl member 7 is pulled by a spring 9, thereby enabling the forward end portion $7a$ thereof to engage with one of the teeth $3b$, $3d$ to $3i$ of the ratchet wheel 3.

The reference numeral 10 denotes a locking pawl member which is pivotally supported on a shaft 11. The rear end portion of the locking pawl member 10 is pulled by a spring 12 such that the forward end portion 10a and locking portion 10b of the locking pawl member 10 are constantly biased counterclockwise. A rectangular projection 7b is formed on the reverse side of the ratchet pawl member 7, that is, on the side thereof which is closer to the locking pawl member 10, so that, when the ratchet pawl member 7 pivots counterclockwise, the locking portion 10b of the locking pawl member 10 is engageable with the projection 7b.

The reference numeral 13 denotes a lock releasing member which is supported by a pin 14 through a slot 13a formed therein such that the lock releasing member 13 is movable in the longitudinal direction and pivotal in the lateral direction. The lock releasing member 13 is biased by the action of a spring 15 both leftward in the longitudinal direction and clockwise in the lateral direction. The forward end portion 13c of the lock releasing member 13 is retained by the projection 7b of the ratchet pawl member 7 in such a manner that it is biased counterclockwise against the biasing force from the spring 15. However, when the ratchet pawl member 7 pivots counterclockwise, the lock releasing member 13 which is subjected to the biasing force from the spring 15 pivots clockwise until it abuts against a fixed pin 16.

A ratchet wheel 17c is integrally formed on the same shaft 18 that carries the control gear 17. A saw-toothed portion 17a is formed on the outer periphery of the ratchet wheel 17c. The saw-toothed portion 17a is capable of contacting the rear end portion 13b of the lock releasing member 13.

Further, the control gear 17 is formed with a pin projection 17b which abuts against the forward end portion 19b of a sector (blade) opening and closing member 19 and drives it when the control gear 17 rotates clockwise. The sector opening and closing member 19 is pivotally supported on a shaft 20 and constantly biased clockwise by the action of a spring 21. A pin 19a which is provided on the rear end portion of the sector opening and closing member 19 is coupled to sectors (not shown), so that the sectors can be opened by counterclockwise movement of the sector opening and closing member 19.

Figure 2:
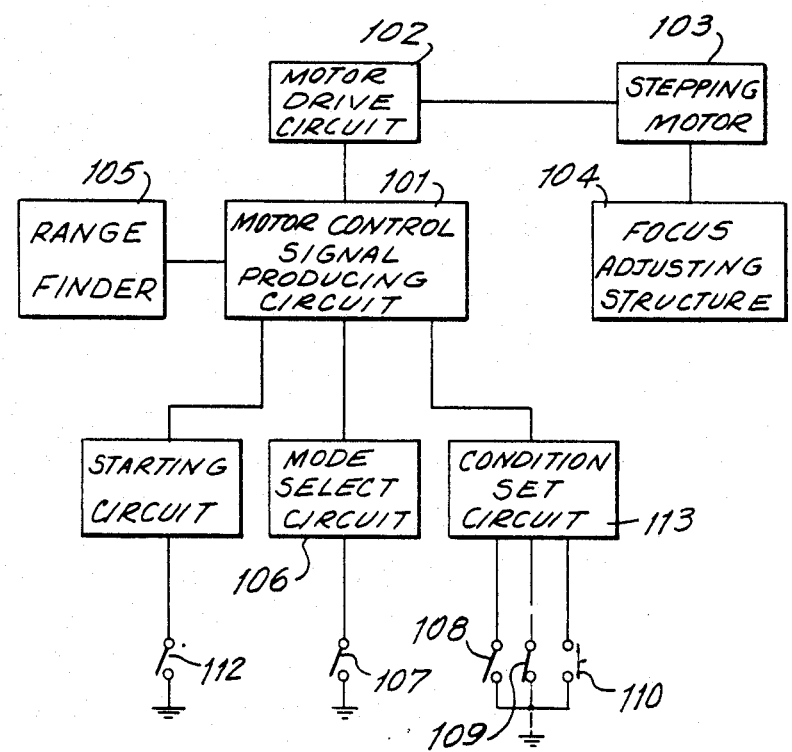

FIG. 2 shows a controller for a camera such as that described above. The reference numeral 101 denotes a motor control signal producing circuit (i.e., motor control means) which outputs a control signal for a stepping motor 103. The reference numeral 102 denotes a motor drive circuit which is supplied with the control signal from the motor control signal producing circuit 101 to drive the stepping motor 103. The reference numeral 104 denotes a focus adjusting structure which is driven by the stepping motor 103. The focus adjusting structure 104 comprises a series of members including the gear 1, drive gear 2, ratchet wheel 3, lens drive ring 5, etc.

The reference numeral 105 denotes a range finder (i.e., measuring means) which measures a distance to an object and outputs a distance signal to the motor control signal producing circuit 101. The numeral 106 denotes a mode select circuit which switches over the normal shooting mode and the adjustment mode in an infinite distance from one to the other through a switch 107. The reference numeral 111 denotes a starting circuit which is turned on through a switch 112. The numeral 113 denotes a condition set circuit which enables various conditions to be set through switches 108 to 110.

The operation of the camera described above will next be explained. First, the mode select circuit 106 of the camera is set in the normal shooting mode through the switch 107. At the beginning, the lens drive and exposure control mechanism is in an initial position such as that shown in FIG. 1. As a release button (not shown) is pressed, a photometric circuit (not shown) and the range finder 105 are energized to calculate a correct exposure quantity and a lens thrust quantity. Thereafter, the stepping motor 103 is activated to rotate the gear 1 clockwise as viewed in FIG. 1. In consequence, the drive gear 2 rotates counterclockwise while driving the arm 3a through the projection 2a, thus causing the ratchet wheel 3 to rotate counterclockwise.

Figure 3:
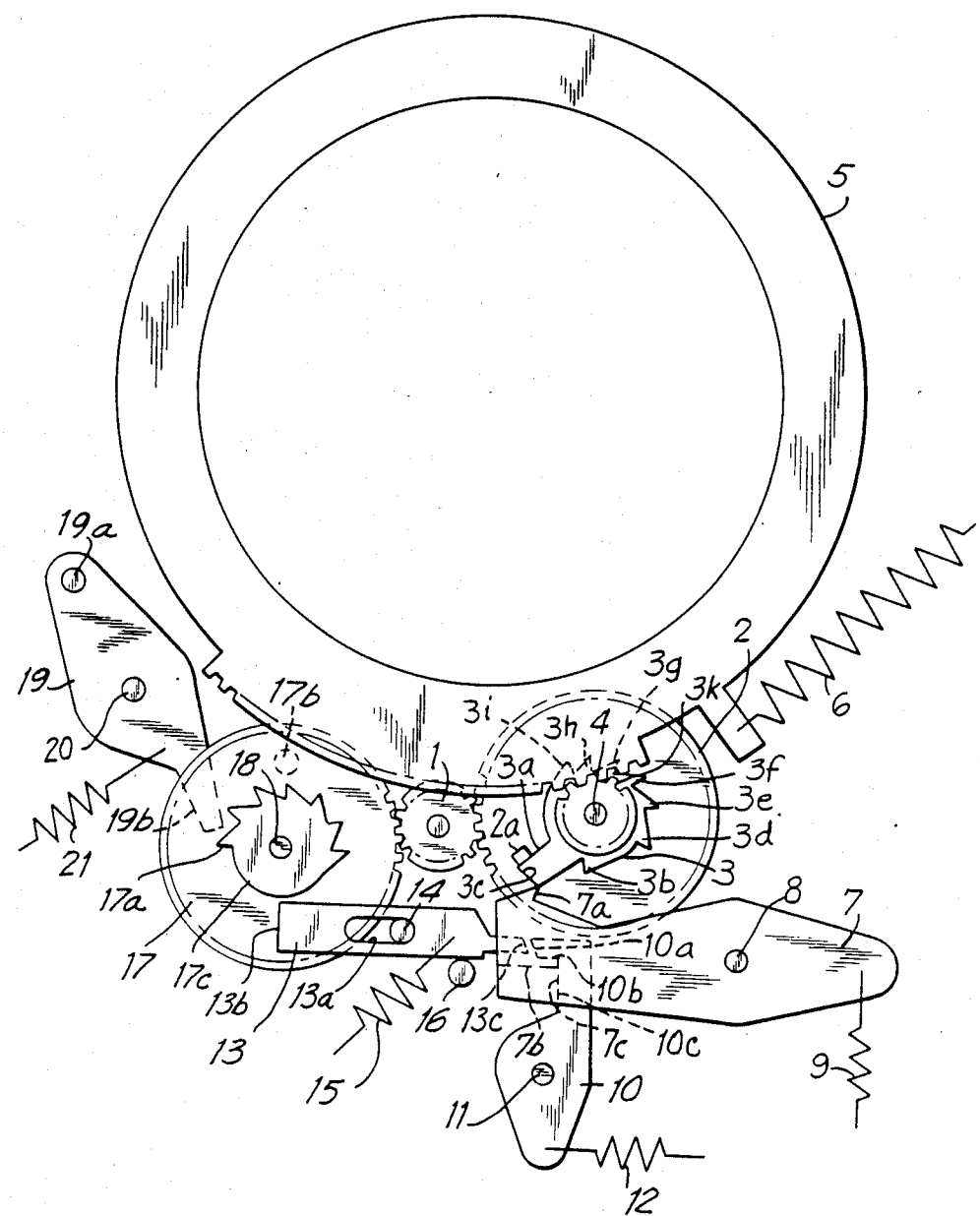

As shown in FIG. 3, as the forward end portion 7a of the ratchet pawl member 7 slides on the slant surface of the arm 3a and rides on the top portion 3c of the arm 3a, the ratchet pawl member 7 pivots counterclockwise, resulting in the projection 7b moving downward as viewed in FIG. 3. In consequence, the forward end portion 10a of the locking pawl member 10 is disengaged from the projection 7b, so that the locking pawl member 10 which is subjected to the biasing force from the spring 12 pivots counterclockwise, thus bringing the locking portion 10b to a position where it face the projection 7b and is engageable therewith.

Figure 4:
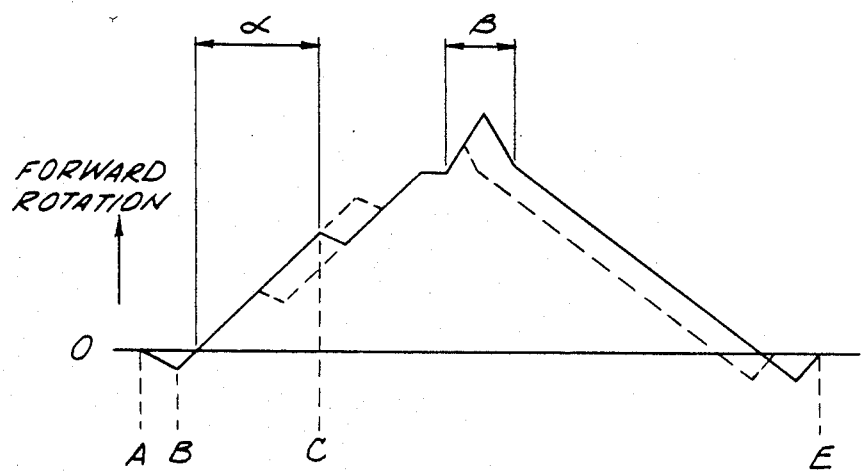

At this time, the lock releasing member 13 is also pivoted by the action of the spring 15 until it abuts against the fixed pin 16. In consequence, the rear end portion 13b of the lock releasing member 13 comes close to the ratchet wheel 17c so as to be able to contact the saw-toothed portion 17a. In this way, the lens drive and exposure control mechanism is shifted from the initial position A to the second position B, as shown in FIG. 4.

After the state shown in FIG. 3 has been reached, the gear 1 starts to rotate in the reverse direction, i.e., counterclockwise, and the lens drive ring 5 is rotated a little counterclockwise by the action of the spring 6, causing the ratchet wheel 3 to rotate clockwise. As a result, the forward end portion 7a of the ratchet pawl member 7 disengages from the top portion 3c of the arm 3a and the projection 7b comes into contact with the locking portion 10b of the locking pawl member 10, thus preventing the ratchet pawl member 7 from being further pivoted by the action of the spring 9. Therefore, the ratchet wheel 3 is continued to rotate clockwise by means of the biasing force from the spring 6 while being in mesh with the lens drive ring 5 without being locked by the ratchet pawl member 7. At this time, the arm 3a rotates while following the projection 2a of the drive gear 2.

Meantime, the control gear 17 also rotates clockwise, and the saw-toothed portion 17a causes the rear end 13b of the lock releasing member 13 to move up and down, that is, oscillate, minutely. However, there is no fear of the lock releasing member 13 acting on other members.

After having rotated counterclockwise by the quantity ($\beta$ shown in FIG. 4) calculated by the range finder 105, the gear 1 rotates clockwise again by a very small quantity. In consequence, the control gear 17 rotates counterclockwise and the saw-toothed portion 17a pushes the rear end portion 13b of the lock releasing member 13 rightward as viewed in FIG. 3, thus causing the forward end portion 13c to push the forward end portion 10a of the locking pawl member 10.

Thus, the projection 7b is disengaged from the locking portion 10b, thereby enabling the ratchet pawl member 7 to rotate clockwise. As a result, the forward end portion 7a engages with one of the teeth 3d to 3i to prevent the ratchet wheel 3 from rotating furthermore.

In consequence, the rotation of the lens drive ring 5 also stops and thus the lens stops at an in-focus position (the third position C shown in FIG. 4). At this time, the forward end portion 13c is driven by the projection 7b so that the lock releasing member 13 pivots counterclockwise, thus eventually canceling the engagement between the rear end portion 13b and the sawtoothed portion 17a.

Thereafter, the gear 1 rotates counterclockwise again, so that the projection 2a of the drive gear 2 disengages from the arm 3a of the ratchet wheel 3. In addition, the control gear 17 rotates clockwise, causing the pin projection 17b to drive the forward end portion 19b so that the sector opening and closing member 19 pivots counterclockwise. Thus, the sectors coupled to the rear end pin 19a are opened to apply exposure by a quantity ($\beta$ shown in FIG. 4) calculated by the photometric circuit. More specifically, the gear 1 reverses so as to rotate clockwise during the exposure process so that the correct amount of exposure is applied and, after the exposure has been finished, the gear 1 continues rotating in the same direction.

Eventually, the projection 2a of the drive gear 2 abuts against the arm 3a again, thus causing the ratchet wheel 3 to rotate counterclockwise. At this time, the lens drive ring 5 also rotates clockwise against the spring 6. The ratchet wheel 3 is rotated through an angle slightly over the initial position (0 in FIG. 4) that is shown in FIG. 1. At this time, the forward end portion 7a successively rides over the teeth from 3i toward 3d and eventually rides over the tooth 3b.

Thereafter, the gear 1 is reversed so as to rotate counterclockwise. In consequence, the arm 3a rotates a little while following the projection 2a so that the forward end portion 7a reliably engages with the tooth 3b. Thus, the ratchet wheel 3 stops in the initial position to complete one cycle of the operation (the position E shown in FIG. 4).

In order to enable the camera to measure the distance correctly and take an in-focus picture as described above, the camera must be subjected to initial adjustment, for example, the focus adjustment in an infinite distance, in the manufacturing process.

To effect the focus adjustment in an infinite distance, the mode select circuit 106 is first switched to the adjustment mode in an infinite distance through the switch 107. Then, the starting circuit 111 is turned on through the switch 112 to start the motor control signal producing circuit 101. In consequence, the motor control signal producing circuit 101 outputs a predetermined signal to the motor drive circuit 102 so as to drive the stepping motor 103 connected to the drive circuit 102.

Figure 5:
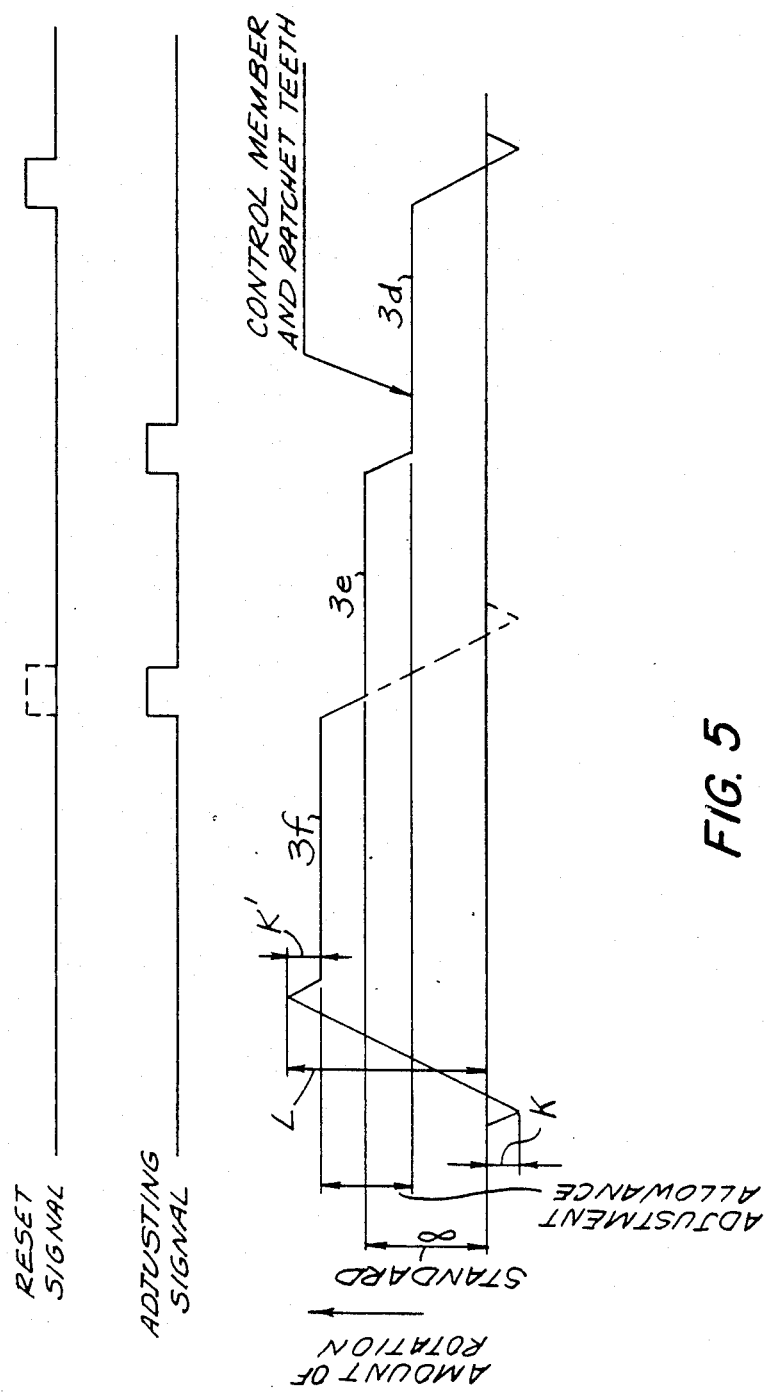
Figure 6:
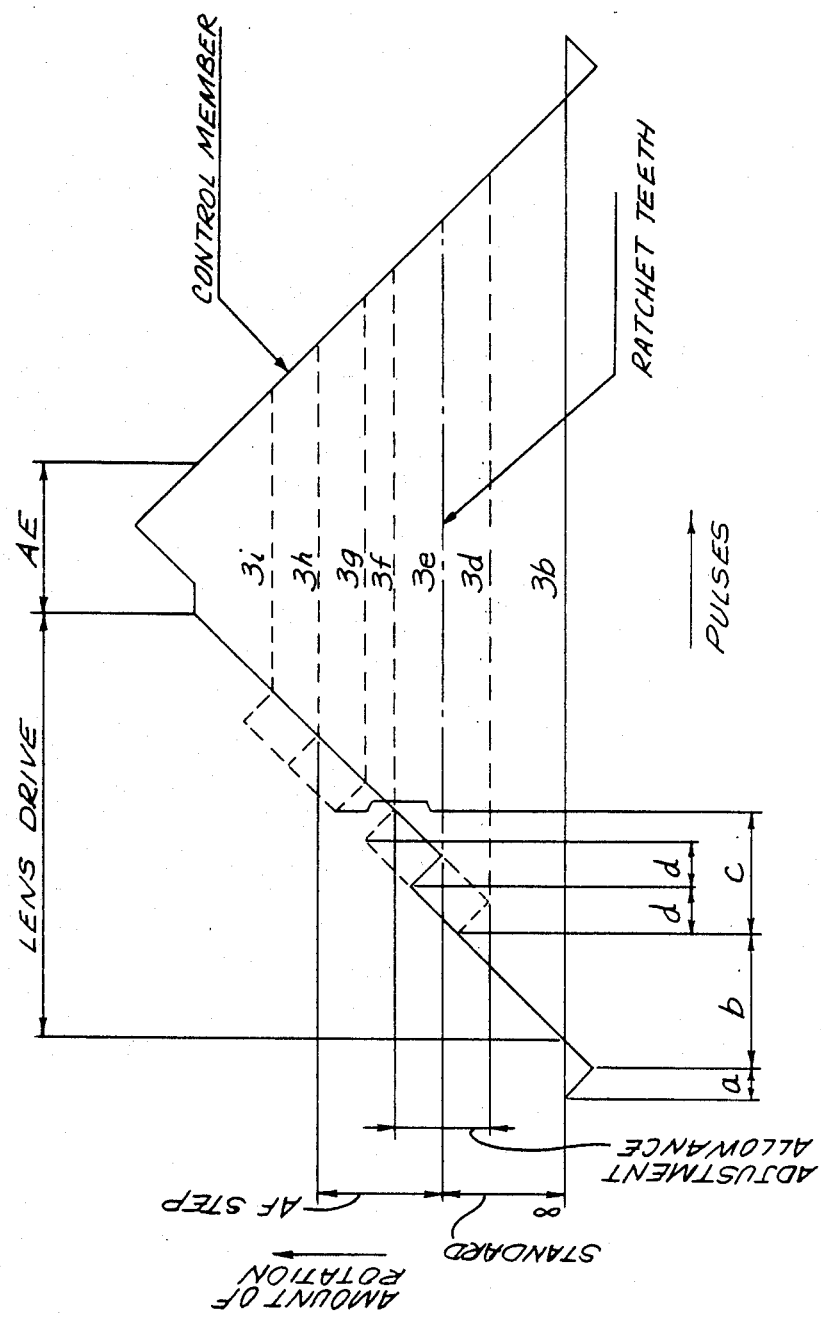

The signal that is output from the motor control signal producing circuit 101 has such directivity and number of pulses that the stepping motor 103 is first rotated counterclockwise through a specified amount (K in FIG. 5), then reversed to rotate clockwise so as to return to the initial position, further rotated clockwise through a predetermined amount (L in FIG. 5) and then reversed so as to rotate counterclockwise through a specified amount (K' in FIG. 5).

In response to this signal, the stepping motor 103 rotates the ratchet wheel 3 that constitutes the focus adjusting structure 104 so that the ratchet pawl 7 is first engaged with the tooth 3f of the ratchet wheel 3 (see FIG. 5).

Thereafter, the sector opening and closing member 19 is activated by a means (not shown) so that the exposure sectors are full opened in order to observe the focus condition. If the focus condition is not good, the switch 110 is turned on. In response to this, the condition set circuit 113 applies an adjustment signal to the motor control signal producing circuit 101. When the switch 110 is turned on once, the motor control signal producing circuit 101 produces a signal that causes the stepping motor 103 to rotate clockwise through a specified amount. In consequence, the ratchet pawl 7 engages with the tooth 3e of the ratchet wheel 3 this time (see FIG. 5).

In this position, the focus condition is observed again. If the focus condition is still no good, the switch 110 is turned on again. In response to this, the condition set circuit 113 applies an adjustment signal to the motor control signal producing circuit 101. When the switch 110 is turned on twice in succession, the motor control signal producing circuit 101 produces a signal that causes the stepping motor 103 to rotate clockwise through an amount double the specified amount. In consequence, the ratchet pawl 7 engages the tooth 3d of the ratchet wheel 3 this time (see FIG. 5).

Such operation is repeated until a good focus condition is obtained (in this embodiment the operation is repeated three times at maximum). If the focus condition is judged to be good. The set position of the switch 107 is changed to apply a reset signal to the motor control signal producing circuit 101. In response to the reset signal, the motor control signal producing circuit 101 returns the stepping motor 103 to the initial state.

Thereafter, setting of conditions is effected using the switches 108 and 109 in order to inform the motor control signal producing circuit 101 at which tooth among the teeth 3d, 3e and 3f of the ratchet wheel 3 a good focus condition is obtained. For example, if the tooth 3d is selected, both the switches 108 and 109 are turned on; if the tooth 3e is selected, the switch 108 alone is turned on; and if the tooth 3f is selected, the switch 109 alone is turned on. The terminals are fixed to ON or OFF position by means of soldering or switches.

The operation taking place in the normal shooting mode will next be described again. When the release button (not shown) is pressed, the range finder 105 is started and, after the distance to an object has been measured, a distance signal is input to the motor control signal producing circuit 101. Then, the motor control signal producing circuit 101 is started to output to the stepping motor 103 a number of pulses determined to be a temporary number of pulses estimated to be necessary to move the lens to an in-focus position on the basis of the input distance signal.

More specifically, the gear 1 first rotates clockwise (a in FIG. 6) and then reverses to rotate counterclockwise through an amount corresponding to the number of pulses (e.g., b+c in FIG. 6) temporarily determined by the range finder 105 and, thereafter, the gear 1 rotates clockwise again through a very small amount. As a result, the ratchet pawl member 7 engages with, for example, the tooth 3g, thereby preventing the ratchet wheel 3 from rotating furthermore, and thus completing the focusing of the lens.

At this time, however, the motor control signal producing circuit 101 is supplied with the ON/OFF conditions of the switches 108 and 109 from the condition set circuit 113 and therefore corrects the above-described number of pulses temporarily determined by adding a given number of pulses thereto in accordance with the input ON/OFF conditions and then outputs the corrected number of pulses. Thus, it is possible to engage the ratchet pawl 7 with a ratchet tooth (e.g., any tooth other than the tooth 3g in FIG. 6) at a position most suitable for focusing the lens. Thereafter, the automatic exposure control operation is conducted and then the mechanism is returned to the initial position to complete the operation.

The relationship between the distance signal and the motor drive pulses will be explained below more specifically. The distance signal obtained by the range finder 105 is input to a pulse number converting circuit (not shown) to calculate a number of pulses and then the signal is input to the motor control signal producing circuit 101. The calculated number of pulses is then corrected in accordance with the conditions input to the circuit 101 from the condition se circuit 113 and the corrected number of pulses is output from the motor control signal producing circuit 101 to the stepping motor 103.

FIG. 7 shows the relationship between the distance signal, the correction quantity and the motor drive pulses output from the motor control signal producing circuit 101. In the figure, the AF step m represents the distance signal and numerical values shown on the right-hand side thereof represent numbers of pulses which are to be output to drive the stepping motor 103. S denotes a value which increases every time m increases by 1, that is, a number of drive pulses per unit AF step. The correction value shown in the bottom line represents a correction quantity with respect to the original number of pulses. More specifically, the original number of pulses increases by 1 as the correction quantity increases by 1. Accordingly, the number of pulses output from the motor control signal producing circuit 101 may be expressed as follows:

$$3+n+(m-1)S$$

wherein
m (AF step)=1, 2, 3 ...

S=the number of pulses per unit step
n (correction quantity)=0, 1, 2 ...

Figure 8:
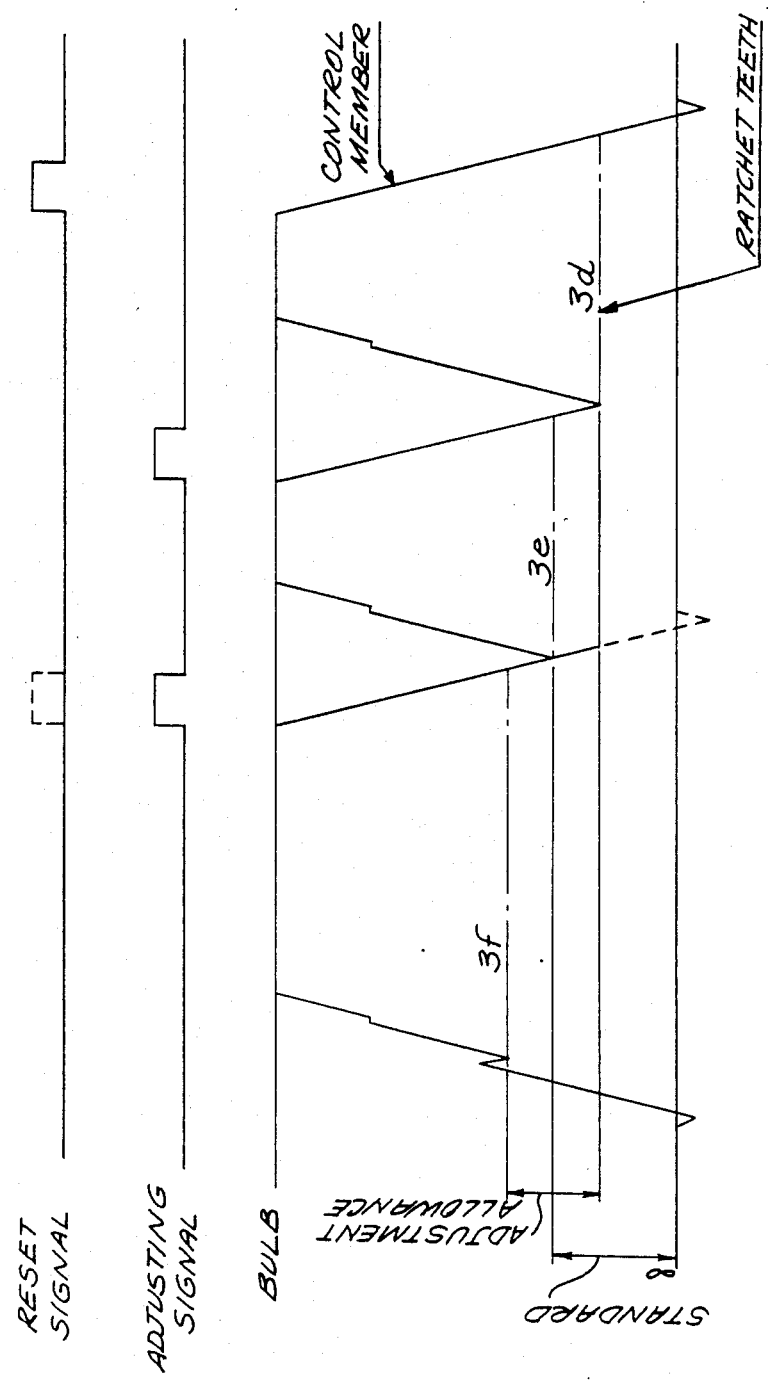
FIG. 8 is a sequence diagram showing another example of focus adjustment in an infinite distance.

It should be noted that, although in the foregoing embodiment the exposure sectors are full opened by actuating the sector opening and closing member 19 by a means (not shown), in the arrangement wherein the lens thrust operation and the automatic exposure operation are effected by means of the same motor as in the above-described embodiment, the sectors may be full opened while the release button is being pressed to observe the focus condition by effecting a predetermined mode changeover operation (see FIG. 8).

Although in the foregoing embodiment a lens drive quantity is calculated every time, the arrangement may be such that a table showing a lens drive quantity for each correction quantity is prepared in the form of a ROM and a particular lens drive quantity is selected from the table. Further, one data may be shifted in accordance with each correction quantity to thereby make adjustment.

Although in the above-described embodiment the number of steps in AF (Automatic Focus adjustment) is 2 and the number of steps in the ratchet adjustment is 3 (i.e., 3d to 3f), these numbers of steps may be greater than said values (see FIG. 7).

In the foregoing embodiment, the spacing of the steps between 3d-3e, 3e-3f, 3g-3h and 3h-3i (i.e., the spacing corresponding to d in FIG. 6) are equal to each other and the height of the step between 3f and 3g alone differs from the others. However, all the steps may have the same spacing.

Further, in the foregoing embodiment the lens drive quantity calculated from the distance signal is corrected so as to obtain an optimal lens position where the test focus condition is available by the focus adjustment in an infinite distance. The same idea may be applied to the adjustment in the automatic exposure operation of the programmed shutter, the adjustment of correct F-number with respect to a particular set time, or the adjustment of F-number corresponding to the object distance in flash photography.

Although in the foregoing embodiment a stepping motor is employed to drive the mechanism, other types of motor may also be employed, for example, a D.C. motor or an ultrasonic motor. In the case of a D.C. motor, a known means such as an encoder may be employed since it is necessary to know the angle of rotation of the motor.

As has been described above, according to the present invention, initial adjustment of a camera in the manufacturing process, for example, the focus adjustment in an infinite distance or the adjustment in an exposure operation, is effected by electronic control and it is therefore possible to provide a device for adjusting a camera in the initial stage which has a simplified mechanism and a lowered cost in comparison with the conventional mechanical devices.

It is also possible to facilitate the inner focusing of a zoom lens in which it has heretofore been difficult to effect focus adjustment.

Although the present invention has been described through specific terms, it should be noted here that the described embodiment is not necessarily exclusive and that various changes and modifications may be imparted thereto without departing from the scope of the invention which is limited solely by the appended claim.

What we claim is:

1. A device for initially adjusting an adjustable structure means, said adjustable structure means adjusting the lens or opening and closing sectors of a camera in response to variable criteria related to the subject matter to be photographed by said camera comprising:
   motor means moving said adjustable structure means;
   motor control means connected to said motor means for controlling the rotation of said motor means;
   measuring means connected to said motor control means for measuring said variable criteria and outputting a measure signal to said motor control means; and
   measured signal compensating means connected to said motor control means and outputting an adjustment signal to said motor control means to correct said measured signal.

2. A device according to claim 1, wherein said measured signal compensating means comprises switch means actuatable to provide different switch states such that said adjustment signal is changeable in correspondence to the different switch states.

3. A device according to claim 1 whereby said measured signal compensating means is operable to electronically provide for adjusting said adjustable structure means to an initial adjustment setting corresponding to a known criteria of said variable criteria.

4. A device according to claim 3, wherein said motor control means is operable to receive an adjustment signal from said measured signal compensating means corresponding to said initial adjustment setting and to correct said measured signal and apply said corrected signal to said motor means.

5. A device according to claim 3, wherein said measured signal compensating means comprises switch means operable to adjust said initial adjustment setting.

6. A device according to claim 5, wherein said measured signal compensating means is operable to provide an adjustment signal to said motor control means corresponding to said initial adjustment setting.

7. A device according to claim 3, wherein said measured signal compensating means comprises switch means having different operable states to apply said adjustment signal to said motor control means corresponding to said initial adjustment setting.

8. A device according to claim 1, wherein said motor control means is operable to provide for rotation of said motor means through different amounts of rotation corresponding to said adjustment signal.

9. A device according to claim 5, wherein said measured signal compensating means comprises another switch means operable to apply a reset signal to said motor control means after said initial adjustment setting is attained.

10. A device according to claim 1 further comprising a mode selection circuit means connected to said motor control means and operable to be switched between an adjustment mode and a normal shooting mode.

11. A device according to claim 1, wherein said adjustable structure means comprises a ring member having gear teeth, a rachet wheel member having rachet teeth and gear teeth, said gear teeth on said rachet wheel member meshing with said gear teeth on said ring member, pawl means pivotal between an engaged position in which said pawl means engages said rachet teeth and a disengaged position in which said pawl means is disengaged from said rachet teeth, pawl release means having an operable position which engages said pawl means to maintain said pawl means in said disengaged position and a release position which releases said pawl means such that the pawl means moves from said disengaged to said engaged position, and actuating means driven by said motor means operable to actuate said pawl release means to release said pawl means so that the pawl means engages one of said rachet teeth to thereby establish a setting of said ring member.

12. A device according to claim 1, wherein said measured signal compensating means comprises switch means having a plurality of operable states to provide an adjustment signal to said motor control means such that said motor control means drives said actuating means to actuate said pawl release means so that the released pawl means engages different rachet teeth depending on the operable state of said switch means.

13. A device for initially providing an initial adjustment setting to an adjustable structure means, said adjustable structure means adjusting the lens or opening and closing sectors of a camera in response to variable criteria related to the subject matter to be photographed by said camera comprising:
  a motor means for moving said adjustable structure means;
  motor control means connected to said motor means for controlling the rotation of said motor means;
  measuring means connected to said motor control means for measuring said variable criteria and outputting a measured signal to said motor control means; and
  measured signal compensating means connected to said motor control means and outputting an adjustment signal to said motor control means to corrected said measured signal, said measured signal compensating means being operable to establish an initial adjustment setting of said adjustable structure means corresponding to a known value of one of said variable criteria.

14. A device according to claim 13, wherein one of said variable criteria is the adjustment of the focus, said one known value being the focus of an infinite distance.

15. A device according to claim 13, wherein said measured signal compensating means comprises switch means actuatable to provide said initial adjustment setting during the manufacturing process of said device.

16. A device for initially providing an initial adjustment setting to an adjustable structure means, said adjustable structure means adjusting a camera in response to variable criteria related to the subject matter to be photographed by said camera comprising:
  a motor means for moving said adjustable structure means;
  motor control means connected to said motor means for controlling the rotation of said motor means;
  measuring means connected to said motor control means for measuring said variable criteria and outputting a measured signal to said motor control means; and
  measuring signal compensating means operable to provide an initial adjustment setting signal based on a known criteria of said variable criteria, said measuring signal compensating means outputting said initial adjustment setting signal to said motor control means to repeatedly adjust said measured signal during normal shooting with said camera.

17. A device according to claim 16, wherein one of said variable criteria is the variation of focus of said camera, said known criteria being the focus at an infinite distance.

18. A device according to claim 16 further comprising a mode selection circuit means connected to said motor control means, said mode selection circuit means comprising a switch means operable to be switched between an adjustment mode and a normal shooting mode, said switch means being in said adjustment mode when said measuring signal compensating means operates to establish said initial adjustment setting signal based on said known criteria, said switch means being in said normal shooting mode when said measuring signal compensating means outputs aid adjustment setting signal to said measuring means to adjust said measured signal.

19. A device for initially establishing an initial adjustment setting in an adjustable structure means during the manufacture of said adjustable structure means, said adjustable structure means adjusting a camera in response to variable criteria relating to the subject matter to be photographed by said camera comprising:
  a motor means for moving said adjustable structure means;
  motor control means connected to said motor means for controlling the rotation of said motor means;
  measuring means connected to said motor control means for measuring said variable criteria and outputting a measured signal to said motor control means;
  mode selection circuit means connected to said motor control means and operable to be switched between between an adjustment mode and a normal shooting mode; and measuring signal compensating means operable when said mode selection circuit means is in said adjustment mode to establish an initial adjustment setting signal based on a known criteria of said variable criteria, said measuring signal compensating means outputting said initial adjustment setting signal to said motor control means when said mode selection circuit is in said normal shooting mode to adjust said measured signal during normal shooting with said camera.

20. A device according to claim 19, wherein said mode selection circuit is set to remain in said normal shooting mode after said initial adjustment setting signal has been established during manufacture of said device.

* * * * *